US011212269B2

(12) United States Patent
Christopher et al.

(10) Patent No.: US 11,212,269 B2
(45) Date of Patent: Dec. 28, 2021

(54) SECURE REMOTE ONLINE DEBUGGING OF FIRMWARE ON DEPLOYED HARDWARE

(71) Applicant: American Megatrends International, LLC, Duluth, GA (US)

(72) Inventors: Samvinesh Christopher, Suwanee, GA (US); Anurag Bhatia, Sugar Hill, GA (US); Winston Thangapandian, Suwanee, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 149 days.

(21) Appl. No.: 16/224,036

(22) Filed: Dec. 18, 2018

(65) Prior Publication Data

US 2020/0195624 A1    Jun. 18, 2020

(51) Int. Cl.
*H04L 29/06* (2006.01)
*H04L 12/24* (2006.01)
*H04L 9/08* (2006.01)

(52) U.S. Cl.
CPC ............ *H04L 63/062* (2013.01); *H04L 9/088* (2013.01); *H04L 9/0825* (2013.01); *H04L 41/082* (2013.01)

(58) Field of Classification Search
CPC ..... H04L 63/062; H04L 41/082; H04L 9/088; H04L 9/0825
See application file for complete search history.

(56) References Cited

U.S. PATENT DOCUMENTS

| | | | | |
|---|---|---|---|---|
| 10,049,029 | B1* | 8/2018 | Vu | G06F 11/3656 |
| 2003/0191955 | A1* | 10/2003 | Wagner | G06F 21/572 |
| | | | | 713/191 |
| 2013/0185559 | A1* | 7/2013 | Morel | G06Q 20/32 |
| | | | | 713/168 |
| 2015/0052596 | A1* | 2/2015 | Ayanam | H04W 4/38 |
| | | | | 726/8 |
| 2015/0278552 | A1* | 10/2015 | Chen | H04W 12/08 |
| | | | | 726/34 |
| 2015/0341341 | A1* | 11/2015 | Messerges | H04L 9/32 |
| | | | | 713/151 |
| 2017/0024303 | A1* | 1/2017 | Christopher | G06F 11/366 |
| 2017/0041303 | A1* | 2/2017 | Trimmer | H04L 63/061 |
| 2017/0277862 | A1* | 9/2017 | Allen | G16H 20/13 |
| 2018/0004931 | A1* | 1/2018 | Kounavis | G06F 21/44 |
| 2018/0159845 | A1* | 6/2018 | Aronov | H04L 63/0435 |
| 2019/0004887 | A1* | 1/2019 | Jeyasingh | G06F 11/27 |
| 2020/0019397 | A1* | 1/2020 | Duran | H04L 41/0893 |

(Continued)

*Primary Examiner* — Jeffrey C Pwu
*Assistant Examiner* — William A Corum, Jr.
(74) *Attorney, Agent, or Firm* — Locke Lord LLP; Tim Tingkang Xia, Esq.

(57) ABSTRACT

In an aspect of the disclosure, a method, a computer-readable medium, and a device are provided. The device determines that a target event occurred at a first server in a group of servers that are jointly managed. The device obtains, for the first server, a public-private key pair including a first key and a second key. The device provides the first key to the first server such that the first server is accessible by authentication with the first key. The device provides the second key to a client device such that the first server is accessible by the client device by providing the second key to the server. Subsequently, the device revokes the first key from the first server.

18 Claims, 5 Drawing Sheets

(56) References Cited

U.S. PATENT DOCUMENTS

| | | | |
|---|---|---|---|
| 2020/0021448 A1* | 1/2020 | Chumbley | H04L 9/3271 |
| 2020/0159965 A1* | 5/2020 | Norem | G06F 21/572 |
| 2020/0195632 A1* | 6/2020 | Yuan | H04W 12/06 |
| 2020/0259643 A1* | 8/2020 | Pazhoor | H04L 9/3239 |

* cited by examiner

SECURE REMOTE ONLINE DEBUGGING OF FIRMWARE ON DEPLOYED HARDWARE

BACKGROUND

Field

The present disclosure relates generally to computer systems, and more particularly, to techniques of determining integrity of baseboard management controller (BMC) firmware prior to booting.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Firmware of components of servers is normally well tested in most case scenarios before the servers are deployed. But sometimes bugs can arise because of special conditions of the deployed environment. These special case bugs may not be reproduced at other places. Thus, debugging may have to be conducted on the running firmware. Therefore, there is a need for a mechanism that can provide access to servers securely and conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a device are provided. The device determines that a target event occurred at a first server in a group of servers that are jointly managed. The device obtains, for the first server, a public-private key pair including a first key and a second key. The device provides the first key to the first server such that the first server is accessible by authentication with the first key. The device provides the second key to a client device such that the first server is accessible by the client device by providing the second key to the server. Subsequently, the device revokes the first key from the first server.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
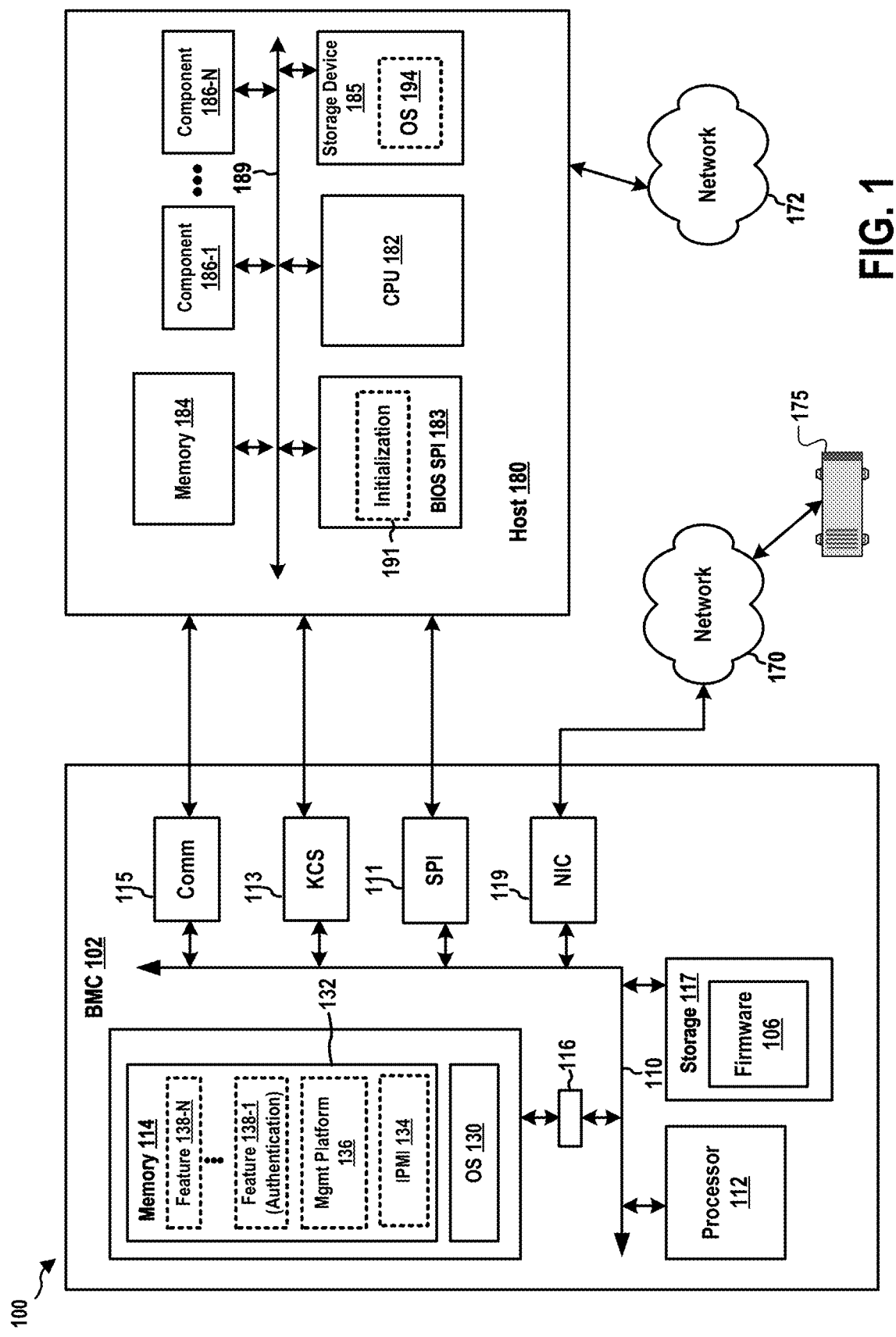
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a SPI interface 111 (Serial Peripheral Interface), a KCS interface 113 (Keyboard Controller Style), a network interface card 119, and other communication interfaces 115.

The communication interfaces 115 may include a Universal Serial Bus (USB) interface, a server management interface chip (SMIC) interface, a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the KCS interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the KCS interface 113, the SPI interface 111, and/or the communication interfaces 115 may be on the same chip. In addition, those components may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134, a management platform 136, and feature components 138-1 to 138-N. Further, the service components 132 may be implemented as a service stack. As such, the BMC firmware 106 can provide an embedded system to the BMC 102. In addition, the storage 117 may provide database(s) 107 that can be accessed by the IPMI services 134 or the management platform 136.

In one example, the management platform 136 may implements REDFISH specification, as defined in "Redfish Scalable Platforms Management API Specification Document Identifier: DSP0266 Date: 2018 Apr. 5 Version: 1.4.1," which is published by Distributed Management Task Force (DMTF) and is expressly incorporated by reference herein in its entirety.

The BMC 102 may be in communication with the host computer 180 through the KCS interface 113, the network interface card 119, the communication interfaces 115, the SPI interface 111, and/or the IPMI interface.

The host computer 180 includes a host CPU 182, a host memory 184, a storage device 185, an initialization storage device 183, and component devices 186-1 to 186-N that may be interconnected with each other through a host bus system 189. Further, the initialization storage device 183 may be a SPI device.

The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 502 shown in FIG. 5.

In this example, after the host computer 180 is powered on, the host CPU 182 loads an initialization component 191 from the initialization storage device 183 into the host memory 184 and executes the initialization component 191. In one example, the initialization component 191 is a basic input/output system (BIOS). In another example, the initialization component 191 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 191 may include one or more UEFI boot services.

The initialization component 191, among other things, performs hardware initialization during the booting process (power-on startup). For example, when the initialization component 191 is a BIOS, the initialization component 191 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 191 then initializes the device on which it is located. When the initialization component 191 includes UEFI boot services, the initialization component 191 may also perform procedures similar to POST.

After the initialization is performed, the initialization component 191 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Each of the feature components 138-1 to 138-N, alone or in combination with the IPMI services 134 and/or the management platform 136, may provide a particular functionality. The functionality may be for managing the components of the host computer 180. For example, the feature component 138-1 may implement an authentication mechanism. The feature component 138-1 can authenticate (verify) credentials provided by another device requesting access to the BMC 102. The feature component 138-1 can authenticate different type of credentials. In one example, a device may send username and password to the feature component 138-1 for authentication through an interface of the feature component 138-1. In another example, the feature component 138-1 may be provide with a public key of a public-private key pair. In yet another example, the feature component 138-N may update the firmware of the initialization storage device 183.

Figure 2:
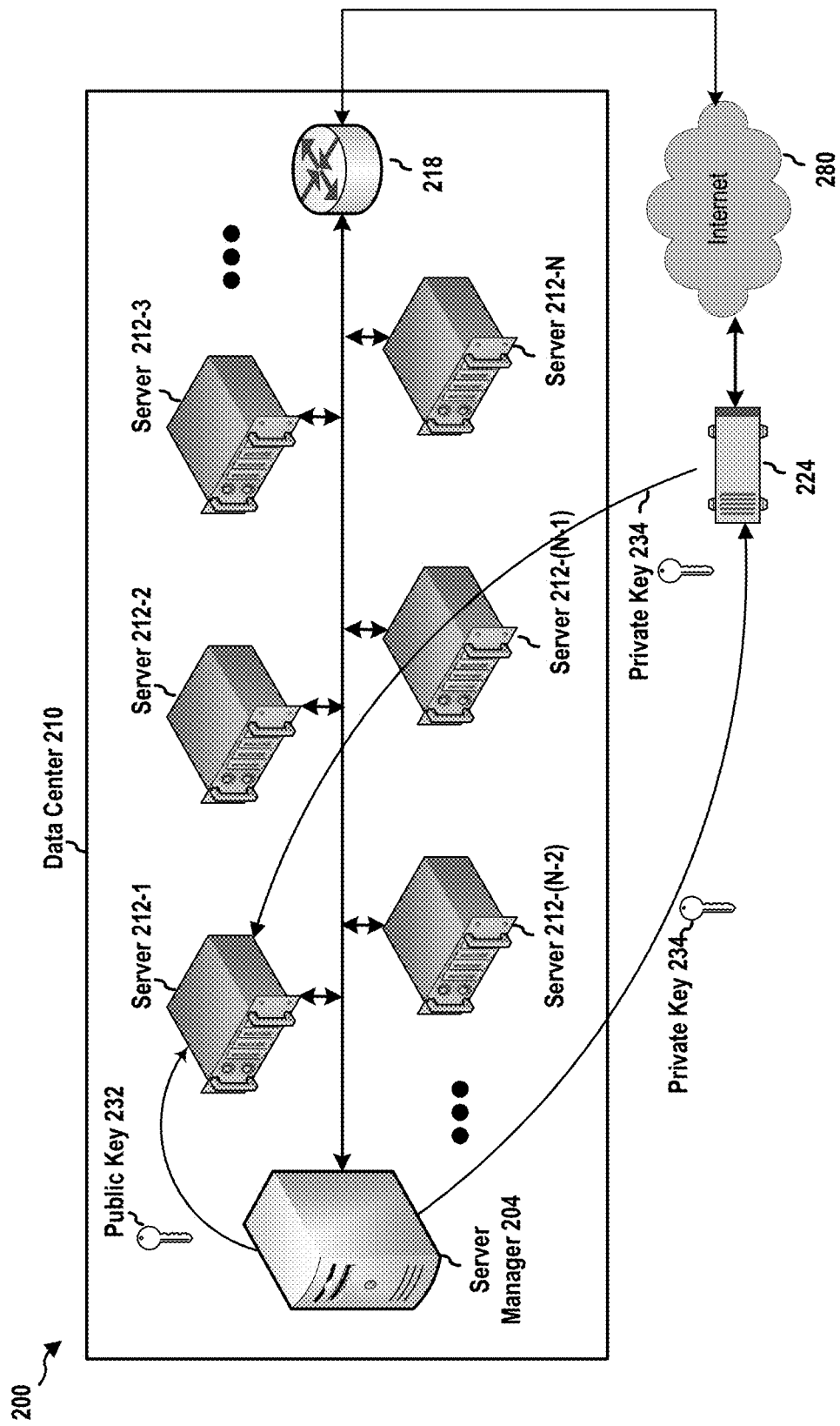
FIG. 2 is a diagram illustrating techniques of granting remote access to a group of servers.

FIG. 2 is a diagram 200 illustrating a group of N servers 212-1 to 212-N. In particular, the servers 212-1 to 212-N may be servers deployed in a data center 210 (or other server farms). Each of the servers 212-1 to 212-N may be a computer system 100 described supra. The servers 212-1 to 212-N is jointly managed by at least a server manager 204. In other words, the server manager 204 can access and manages each of the servers 212-1 to 212-N. The data center 210 is connected to the Internet 280 through a gateway 218.

Firmware of components of the servers 212-1 to 212-N is normally well tested in most case scenarios before the servers 212-1 to 212-N are deployed. But sometimes bugs can arise because of special conditions of the deployed environment. These special case bugs may not be reproduced at other places. Thus, debugging may have to be conducted on the running firmware.

As described supra, the servers 212-1 to 212-N are jointly managed. In certain circumstances, credentials for accessing firmware of a same or similar component on each of the servers 212-1 to 212-N may be intentionally set as the same for ease of management.

In this example, the server 212-1 may be a computer system 100 including a BMC 102 and a host computer 180. During operation, a bug of may arise at the BMC firmware 106 of the BMC 102 or the firmware of each of the component devices 186-1 to 186-N of the host computer 180 at one or more of the servers 212-1 to 212-N. This example described infra uses bugs at the BMC firmware 106 of the BMC 102 of the server 212-1 for illustration. Nonetheless, the techniques described infra can be applied to any firmware of the servers 212-1 to 212-N similarly.

In this example, the server manager 204 detects that a bug exists in the BMC firmware 106 of the BMC 102 of the server 212-1. A remote device 224 from the vendor of the BMC 102 of the server 212-1 may need to access the BMC 102 to conduct debugging. As described supra, for convenience, all firmware of the BMCs of the servers 212-1 to 212-N may be assigned the same login credentials. The server manager 204 may not wish to provide the login credentials to the remote device 224. If provided, the remote device 224 may use the login credentials to access servers other than the server 212-1.

In this example, the server manager 204 generates a public-private key pair including a public key 232 and a private key 234. As described supra, the feature component 138-1 is an authentication component. The feature component 138-1 supports, in addition to login credential such as usernames and passwords, public key/private key authentication mechanism.

After generating the public-private key pair, the server manager 204 uploads the public key 232 to the feature component 138-1 of the BMC 102 through an interface provided by the feature component 138-1. As such, the feature component 138-1 may use the public key 232 to verify a private key.

Further, the server manager 204 sends the private key 234 to a remote device 224. The remote device 224 sends an access request, through the Internet 280 and the gateway 218, to the feature component 138-1 of the BMC 102 at the server 212-1. In response, the feature component 138-1 may provide an interface through which the remote device 224 may input the private key 234 to the feature component 138-1. Subsequently, the remote device 224 inputs the private key 234 to the feature component 138-1.

Upon receiving the private key 234 from the remote device 224, the feature component 138-1 of the BMC 102 at the server 212-1 matches the private key 234 with the public key 232 to determine whether the public key 232 and the private key 234 are from the same public-private key pair.

When the private key 234 matches the public key 232, the feature component 138-1 determines that the remote device 224 is authenticated and authorized to access the BMC firmware 106 of the BMC 102. Accordingly, the feature component 138-1 allows the remote device 224 to access the BMC firmware 106 and conducts a debugging process. Through the debugging process, the remote device 224 may identify the errors existing in the BMC firmware 106 of the BMC 102. The remote device 224 may further repair the BMC firmware 106 and remove the cause(s) of the errors.

After a predetermined time period or after the errors at the BMC 102 of the server 212-1 have been removed/remedied, the server manager 204 may request the feature component 138-1 to remove or destroy the public key 232. As such, even though the remote device 224 may still have the private key 234, the remote device 224 cannot access the BMC firmware 106 of the BMC 102.

Figure 3:
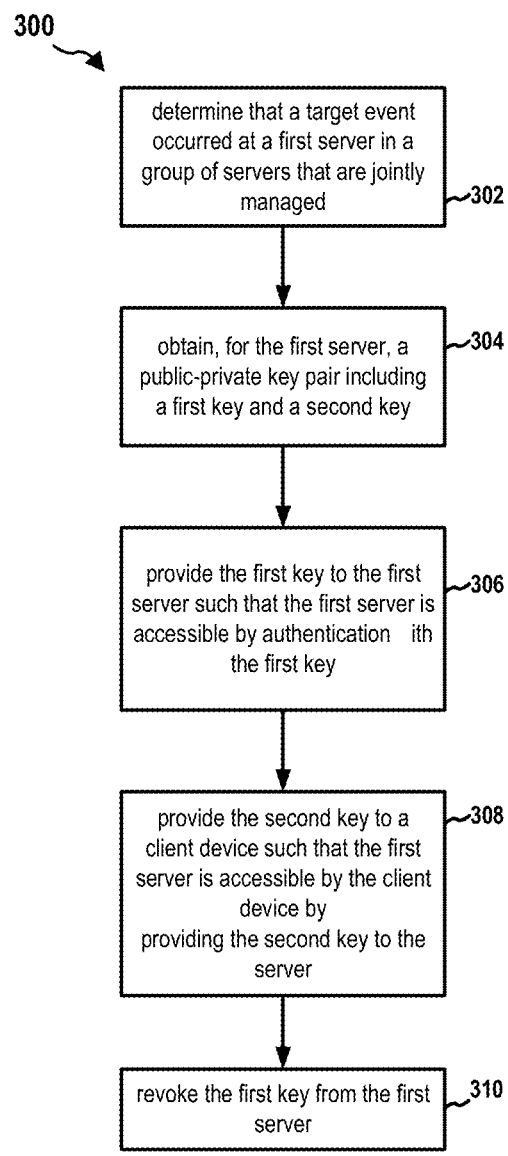
FIG. 3 is a flow chart of a method (process) for managing remote access to a group of servers.

FIG. 3 is a flow chart 300 of a method (process) for managing remote access to a group of servers. The method may be performed by a device (e.g., the server manager 204, the apparatus 204'). At operation 302, the device determines that a target event occurred at a first server in a group of servers that are jointly managed. At operation 304, the device obtains, for the first server, a public-private key pair including a first key and a second key. At operation 306, the device provides the first key to the first server such that the first server is accessible by authentication with the first key. At operation 308, the device provides the second key to a client device such that the first server is accessible by the client device by providing the second key to the server. Subsequently, at operation 310, the device revokes the first key from the first server.

In certain configurations, the target event is occurred at a component of the first server. In certain configurations, the first key is provided to firmware executed on the component. In certain configurations, the device generates the public-private key pair at the management device.

In certain configurations, the first key is a public key of the public-private key pair. In certain configurations, the first key is a private key of the public-private key pair. In certain configurations, the providing the first key to the first server includes uploading the first key to the first server through an interface of the first server.

In certain configurations, the computer system further includes the first server. The first server receives the first key from the management device. The first server receives the second key from the client device in an authentication process. The first server matches the second key with the first key. The first server allows the client device to access the first server when the second key matches the first key.

Figure 4:
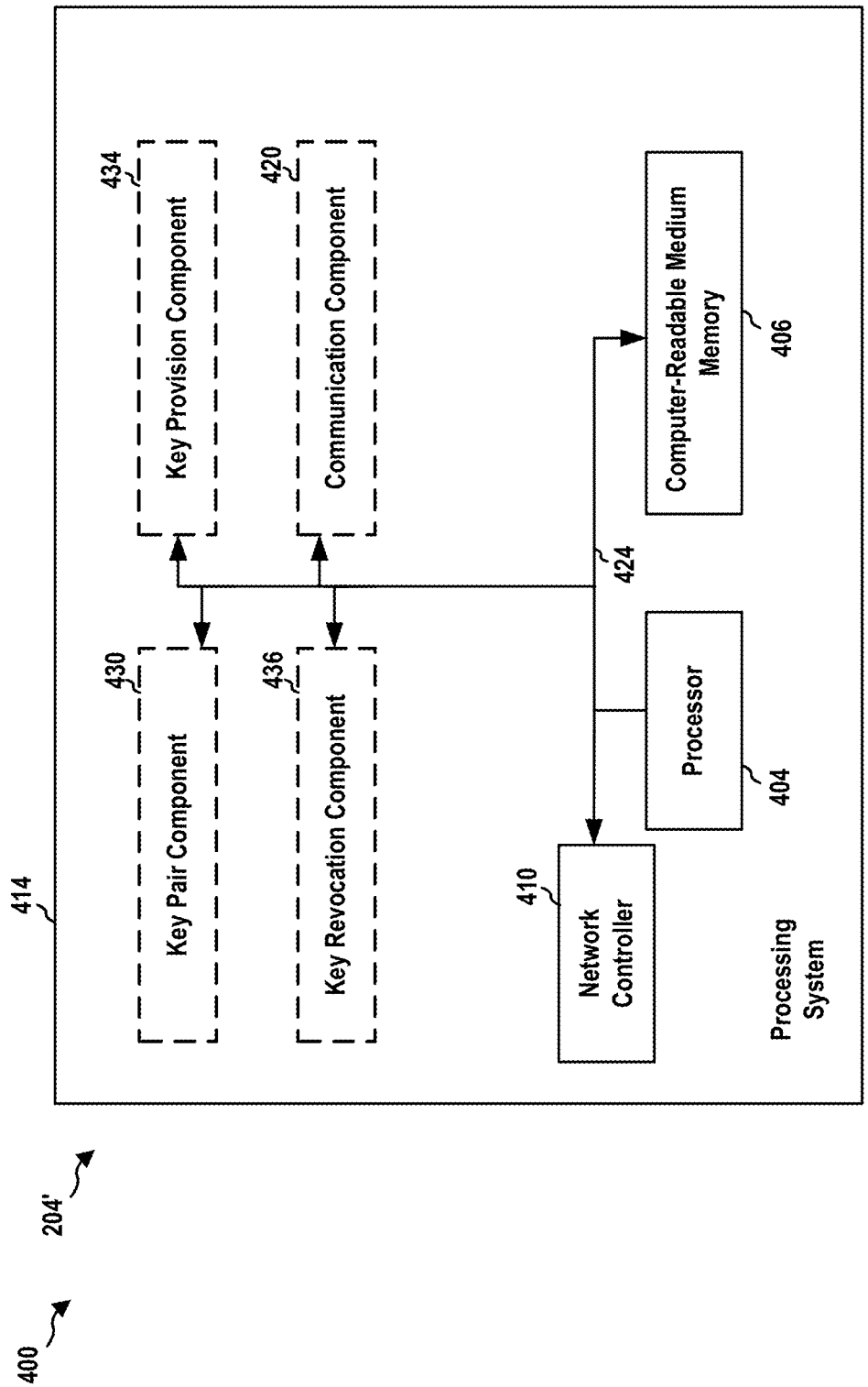
FIG. 4 is a diagram illustrating an example of a hardware implementation for an apparatus employing a processing system.

FIG. 4 is a diagram 400 illustrating an example of a hardware implementation for an apparatus 204' employing a processing system 414. The apparatus 204' may implement the server manager 204. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the computer-readable medium/memory 406, a network controller 410, etc.

The computer-readable medium/memory 406 may include the memory 114 and/or the storage 117. The bus 424 may also link various other circuits such as timing sources, peripherals, voltage regulators, and power management circuits, which are well known in the art, and therefore, will not be described any further.

The processing system 414 may be coupled to the network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 204'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of a key pair component 430, a key provision component 434, and a key revocation component 436. The components may be software components running in the processor 404, resident/stored in the computer readable medium/memory 406, one or more hardware components coupled to the processor 404, or some combination thereof.

In particular, the key pair component 430 determines that a target event occurred at a first server in a group of servers that are jointly managed. The key pair component 430 obtains, for the first server, a public-private key pair including a first key and a second key. The key provision component 434 provides the first key to the first server such that the first server is accessible by authentication with the first key. The key revocation component 436 provides the second key to a client device such that the first server is accessible by the client device by providing the second key to the server. Subsequently, the key revocation component 436 may revoke the first key from the first server.

The apparatus 204' may be configured to include means for performing operations described supra referring to FIG. 3. The aforementioned means may be one or more of the aforementioned components of the apparatus 204 and/or the processing system 414 of the apparatus 204' configured to perform the functions recited by the aforementioned means.

Figure 5:
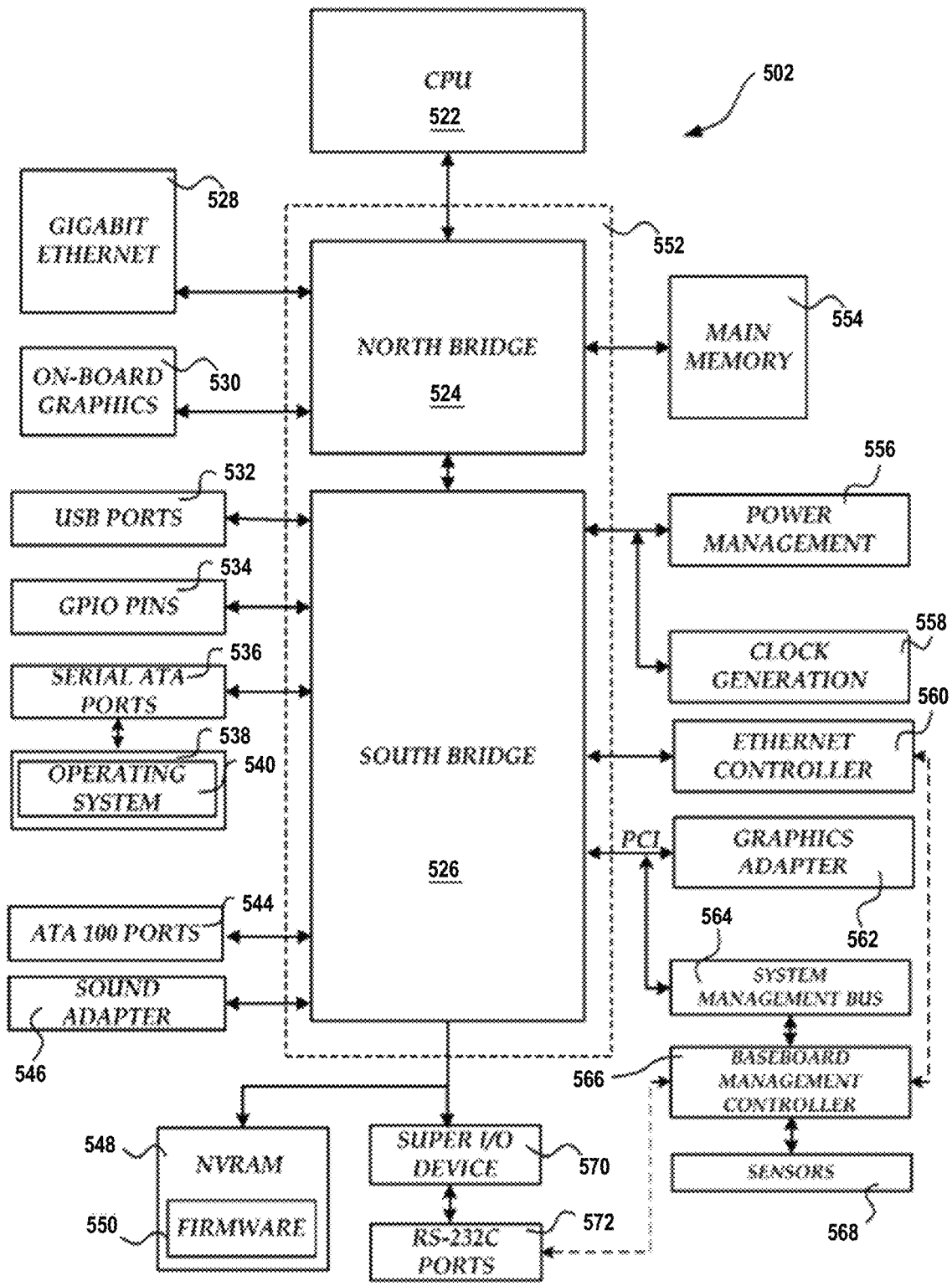
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including hand-held computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system including a management device and a first server, comprising:
    determining, at the management device, that a target event occurred at the first server in a group of servers that are jointly managed;
    obtaining, at the management device and for the first server, a public-private key pair including a first key and a second key;
    sending, from the management device to the first server, the first key such that the first server uses the first key to determine if a given key is the second key for authentication;
    receiving, at the first server, the first key from the management device;
    sending, from the management device to a client device, the second key such that the client device sends the second key to the first server for authentication;
    receiving, at the first server, the second key from the client device in an authentication process;
    sending, from the client device, an access request including a copy of the second key to the first server for authentication; and
    in response to receiving the access request, matching the copy of the second key with the first key and verifying, at the first server and based on the first key, the copy of the second key included in the access request is from a same public-private key pair of the first key, and grants allowing, at the first server, the client device to access the first server when the copy of the second key is verified by using the first key and the copy of the second key matches the first key.

2. The method of claim 1, wherein the target event is occurred at a component of the first server, wherein the first key is provided to firmware executed on the component.

3. The method of claim 1, further comprising: generating the public-private key pair at the management device.

4. The method of claim 1, wherein the first key is a public key of the public-private key pair.

5. The method of claim 1, wherein the first key is a private key of the public-private key pair.

6. The method of claim 1, wherein the providing the first key to the first server includes uploading the first key to the first server through an interface of the first server.

7. The method of claim 1, further comprising: revoking the first key from the first server.

8. A computer system comprising:
    a management device, the management device including:
    a memory; and
    at least one processor coupled to the memory and configured to:
    determine, at the management device, that a target event occurred at a first server in a group of servers that are jointly managed;
    obtain, at the management device and for the first server, a public-private key pair including a first key and a second key;
    send, from the management device to the first server, the first key such that the first server uses the first key to determine if a given key is the second key for authentication;
    send, from the management device to a client device, the second key such that the client device sends the second key to the first server for authentication; and
    send, from the client device, an access request including a copy of the second key to the first server for authentication; and
    the first server, including:
    a server memory; and
    at least one server processor coupled to the server memory and configured to:
    receive, at the first server, the first key from the management device;
    receive, at the first server, the second key from the client device in an authentication process; and
    in response to receiving the access request, match the copy of the second key with the first key and verify, at the first server and based on the first key, the copy of the second key included in the access request is from a same public-private key pair of the first key and allow, at the first server, grants the client device to access the first server when the copy of the second key is verified by using the first key and the copy of the second key matches the first key.

9. The apparatus of claim 8, wherein the target event is occurred at a component of the first server, wherein the first key is provided to firmware executed on the component.

10. The apparatus of claim 8, wherein the at least one processor is further configured to: generate the public-private key pair at the management device.

11. The apparatus of claim 8, wherein the first key is a public key of the public-private key pair.

12. The apparatus of claim 8, wherein the first key is a private key of the public-private key pair.

13. The apparatus of claim 8, wherein to provide the first key to the first server, the at least one processor is further configured to: upload the first key to the first server through an interface of the first server.

14. The apparatus of claim 8, wherein the at least one processor is further configured to: revoke the first key from the first server.

15. A non-transitory computer-readable medium storing computer executable code for operating a management device o and a first server f a computer system, comprising code to:

determine, at the management device, that a target event occurred at the first server in a group of servers that are jointly managed;

obtain, at the management device and for the first server, a public-private key pair including a first key and a second key;

send, from the management device to the first server, the first key such that the first server uses the first key to determine if a given key is the second key for authentication;

receive, at the first server, the first key from the management device;

send, from the management device to a client device, the second key such that the client device sends the second key to the first server for authentication;

receive, at the first server, the second key from the client device in an authentication process;

send, from the client device, an access request including a copy of the second key to the first server for authentication; and in response to receiving the access request, match the copy of the second key with the first key and verify, at the first server and based on the first key, the copy of the second key included in the access request is from a same public-private key pair of the first key and grants allow, at the first server, the client device to access the first server when the copy the second key is verified by using the first key and the copy of the second key matches the first key.

16. The non-transitory computer-readable medium of claim 15, wherein the target event is occurred at a component of the first server, wherein the first key is provided to firmware executed on the component.

17. The non-transitory computer-readable medium of claim 15, wherein the code is further configured to: generate the public-private key pair at the management device.

18. The non-transitory computer-readable medium of claim 15, wherein the first key is a public key of the public-private key pair.

* * * * *